(12) United States Patent
Frenger et al.

(10) Patent No.: US 7,178,089 B1
(45) Date of Patent: Feb. 13, 2007

(54) TWO STAGE DATE PACKET PROCESSING SCHEME

(75) Inventors: Pål Frenger, Solna (SE); Erik Dahlman, Bromma (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1169 days.

(21) Appl. No.: 09/643,983

(22) Filed: Aug. 23, 2000

(51) Int. Cl.
*H03M 13/00* (2006.01)
*H03M 13/03* (2006.01)

(52) U.S. Cl. ..................... 714/774; 714/704

(58) Field of Classification Search ............. 714/704, 714/705, 708, 748, 749, 750, 751, 774; 370/437, 370/465; 375/240.02
See application file for complete search history.

(56) References Cited

U.S. PATENT DOCUMENTS

| | | | |
|---|---|---|---|
| 5,701,294 A * | 12/1997 | Ward et al. | 370/252 |
| 5,923,650 A * | 7/1999 | Chen et al. | 370/331 |
| 6,167,031 A * | 12/2000 | Olofsson et al. | 370/252 |
| 6,392,572 B1 * | 5/2002 | Shiu et al. | 341/81 |
| 6,396,804 B2 * | 5/2002 | Odenwalder | 370/209 |
| 6,397,367 B1 * | 5/2002 | Park et al. | 714/786 |

FOREIGN PATENT DOCUMENTS

| | | |
|---|---|---|
| EP | 0 903 883 A | 3/1999 |
| WO | 95/12943 A | 5/1995 |

OTHER PUBLICATIONS

Stephen B. Wicker, "Error Control Systems for Digital Communications and Storage", Prentice-Hall, 1995, pp. 392-409.*
3rd Generation Partnership Project; Technical Specification Group Group Radio Access Network; Multiplexing and channel coding (FDD) [3G TS 25.212 version 3.1.0].*
*Proceedings of ICUPC '95—4th IEEE International Conference on Universal Personal Communications*, Tokyo, Japan, Nov. 6-10, 1995, pp. 22-26, XP000689904, H. Matsuoka et al., "Adaptive Modulation System With Punctured Convolutional Code for High Quality Personal Communication Systems".
*1999 IEEE 49th Vehicular Technology Conference*, Houston, Texas, USA, vol. 2, May 16-20, 1999, pp. 938-942, XP000903185, 1999, Piscataway, NJ, USA, IEEE, USA, ISBN: 0-7803-5565-2, S. Eriksson et al., "Comparison of link quality control strategies for packet data services in EDGE".
3rd Generation Partnership Project; Technical Specification Group Radio Access Network; Multiplexing and channel coding (FDD) (Release 1999), 3G TS 25.212 V.3.2.0 (Mar. 2000).

* cited by examiner

*Primary Examiner*—Joseph Torres
(74) *Attorney, Agent, or Firm*—Nixon & Vanderhye P.C.

(57) ABSTRACT

Data packets are efficiently combined to fit into a transmission interval. A current communications condition, e.g., the current channel quality, is detected and used to select an appropriate combination of modulation and channel encoding parameters. However, data packets are combined and pre-encoded before the modulation and/or coding scheme (MCS) to be used in a specific transmission interval is known. Once the MCS is known for the transmission interval, an appropriate number of pre-processed data blocks are combined. Some complex packet processing operations can be performed in advance, without any knowledge of the MCS.

44 Claims, 6 Drawing Sheets

TWO STAGE DATE PACKET PROCESSING SCHEME

FIELD OF THE INVENTION

The present invention relates to data communications, and more particularly, to packet data transmission in a changing transmission environment.

BACKGROUND AND SUMMARY OF THE INVENTION

Rapidly changing communication environments present significant challenges for packet data communications. Mobile radio communication systems are one of the best examples of such an environment. Mobile communication systems must accommodate rapid movement of a mobile radio as the mobile subscriber moves about on foot, in an automobile or other vehicle, etc. Other factors that significantly affect the mobile radio transmission and must be taken into account are interference from other transmitters, noise, and fading of the desired signal.

One way to compensate for the rapidly changing radio environment, without having to change transmit power levels dramatically, is to adapt channel coding and/or modulation parameters used in transmitting data packets over a radio channel. When current radio channel quality conditions are favorable, a larger amount of data may be transmitted during a transmission interval by reducing the amount of channel coding and/or by selecting a higher order modulation scheme. On the other hand, when the current radio channel quality conditions are not as favorable, e.g., the channel is in a fading dip, a smaller amount of data may be transmitted by selecting a more robust set of coding and/or modulation parameters.

In a system that employs fast adaptation of coding and/or modulation parameters, it is usually not known which modulation and/or coding scheme will be used until just prior to transmission because the channel vanes so quickly. As a result, a large amount of data packet processing must be performed after the channel condition is detected and the modulation and/or coding scheme is selected. This large amount of processing must be completed before the data can be transmitted. The result is either an increase in hardware requirements or an increase in the processing delay in the transmitter resulting, respectively, in higher costs or slower adaptation to changing channel conditions. Slower link adaptation means slower data transmission speeds resulting from increased retransmissions or a more conservative selection of coding and modulation parameters.

Typically, multiple operations must be performed to prepare data packets for transmission over a communications channel. Supplemental data bits are typically added to each data packet. Data packet sequence number bits, CRC bits, and tail bits are examples of such supplemental bits. Sequence numbers may be needed to keep track of which packets have been successfully communicated and/or to ensure that the packets are received in the correct order. CRC (cyclic redundancy check) bits are included to aid the receiver in determining whether a data packet contains errors. Insertion of tail bits may be required for certain types of channel encoders, (e.g., turbo encoders and convolutional encoders), to force the encoder into a predefined state at the end of a data block/packet to be transmitted.

After this type of packet processing, a certain number of processed packets may be combined and channel encoded. The number depends on the selected coding rate and/or modulation scheme. The encoded bits are modulated using a desired modulation scheme. The modulation scheme maps bits into points belonging to the selected signal constellation. Example signal constellations include QPSK, 8-PSK, 16-QAM, and 64-QAM.

In order to achieve higher data transmission rates, the tasks outlined above must be performed faster, either by brute force or by increased efficiency. A problem with adapting the modulation scheme and/or coding rate for a rapidly changing communications channel is that how some of those tasks outlined above are performed depends on the particular modulation scheme or coding rate selected. In other words, such tasks cannot be performed until the modulation scheme and/or coding rate is (are) selected. Because the modulation and coding parameters determine the amount of data, (e.g., the number of data packets), to be transmitted in a specific transmission interval, transport block processing operations that depend on the amount of data to transmit cannot be done before the modulation scheme and coding rate for that transmission interval are selected. Unfortunately, when transmission channel conditions are rapidly changing, there is only a short time period after the selection is made to perform the necessary tasks.

One way to increase data processing efficiency is to perform computationally intensive operations that do not depend on the modulation scheme or coding rate in advance. For example, adding supplemental bits to the data packets can be done before a modulation scheme and/or coding rate is selected for a particular transmission interval. Channel encoding is computationally intensive and time consuming, but the desired coding rate of the transmitted data depends on the coding rate selection. However, if the data is first encoded in a fixed rate channel encoder, an instantaneous, desired coding rate may still be achieved by appropriately "puncturing" the fixed rate, encoded data. In this way, only the puncturing operation depends on the selected coding rate. Puncturing allows a large family of different effective coding rates to be obtained from a fixed rate channel encoder output. Fortunately, puncturing can be performed in a much shorter time than it takes to channel encode the data. Using this fixed encoder-puncturing technique, most of the computationally intensive and time consuming channel encoding can be performed on the user data packets in advance rather than waiting until a decision is made regarding the modulation scheme or coding rate to be used.

Indeed, once a decision is made to transmit data using a specific modulation scheme and/or coding rate, there is very little time to process the data packets in time for transmission during an up-coming time slot. For example, the transmission channel conditions for a fast moving (e.g., 150 km/h) mobile data user change so rapidly that the currently selected modulation scheme and/or coding rate becomes outdated very quickly. At high data rates, even puncturing and modulation operations are difficult to perform in the short time available after the selection is made before the upcoming time slot arrives.

The present invention pre-processes data packets by performing processing operations that do not depend on the selection of a particular modulation scheme and/or coding rate. For example, packet processing, channel encoding, and buffering may be performed as soon as the data packets are available. However, in this general implementation, the block size of the channel encoder is only the total number of bits corresponding to a data packet plus its supplemental bits. For some encoder structures, this relatively small data block size negatively impacts the channel encoder performance.

Another disadvantage of a relatively small data block size relates to reliable data packet delivery schemes such as Automatic Repeat reQuest (ARQ). Automatic repeat request is commonly used in packet data systems to ensure correct reception of the transmitted data. In a typical ARQ system, when the data is correctly received, an acknowledge (ACK) signal is sent to inform the transmitter that the data associated with the ACK signal was correctly received. The receiver sends a negative-acknowledge (NACK) signal back to the transmitter each time an error is detected in the received data. This triggers the transmitter to retransmit all or parts of the data.

When a retransmission occurs, it is not necessary for the receiver to discard the data packets previously received. Instead, a technique known as "soft combining" may be used to improve the accuracy of the data decoding. In soft combining, the received packet from the original transmission and any previous retransmissions are combined with the presently received retransmission. The channel decoder uses the combined information of the presently received retransmission and the previously transmitted signal packet(s) to more accurately decode that data packet.

Although transmission of acknowledgement signals is often performed for each individual data packet transmitted, this individual treatment creates a significant control signaling load, e.g., ACK/NACK signals for each packet transmission plus retransmission for each packet not positively acknowledged. One way that control signaling load could be reduced is to acknowledge the entire block of data packets transmitted in a certain transmission interval. That kind of acknowledgement would reduce the amount of ACK/NACK signaling required. However, even if only one packet was received in error, it would still be necessary to retransmit all data packets in the corresponding transmission interval despite the fact the rest of the data packets were correctly received. This is not an effective use of channel resources.

It is an object of the present invention to enable high speed data communications using efficient data packet transport processing.

It is an object of the present invention to enable high speed data communications using a data packet processing scheme that permits fast adaptation of the data transmission modulation scheme and/or coding rate based on one or more changing communication conditions.

It is an object of the present invention to enable high speed data communications using a data packet processing scheme that permits larger data block sizes to increase channel coding efficiency.

It is an object of the present invention to enable high speed data communications using a data block transport processing scheme with acknowledgement signaling for groups of data packets rather than individual data packets to reduce related control signaling and permit retransmission with soft combining.

The present invention solves the problems identified above and meets the objects just set forth by providing a high speed data communication scheme that performs flexible and efficient data block transport processing. Data packets are pre-processed for transmission over a communications channel, including performing a first coding operation on those data packets, to form pre-processed data packets. A current communications condition is detected, e.g., the condition of the communications channel during a current transmission time interval or a particular communications service. The pre-processed data packets are processed based on the detected condition to form processed data packets ready for transmission over the communications channel. The preprocessing does not depend on the current communications condition.

A method for processing data packets in accordance with an example implementation of the present invention includes combining a first and second set of data blocks which are coded in respective fixed rate channel encoders. The combining and encoding may be performed as soon as the data packets arrive. The first and second channel encoded data blocks are combined and then punctured in order to achieve a desired channel rate. The punctured data block is modulated in accordance with a desired modulation scheme. The combining of the channel encoded data blocks along with the puncturing and modulating operations may be performed in accordance with a current communications condition. The condition may be, for example, the quality of the communications channel during a current transmission time interval or a particular communications service. Supplemental information may be added to first and second sets of data packets to produce the first and second set of data blocks, respectively. This adding of supplemental bits may also be performed before the communication condition is detected. If an ARQ scheme is employed, acknowledgment signals and retransmission of data packets are performed for the first and second channel encoded data blocks rather than for individual data packets.

Apparatus in accordance with an example implementation of the present invention may be used in a transmitter. A first processing stage pre-processes data packets for transmission over a communications channel, where a first coding operation is performed on data packets to form the pre-processed data packets. A detector detects a current communications condition. A second processing stage processes the pre-processed data packets based on the detected communications condition to form processed data packets ready for transmission over the communications channel. In contrast to the second processing stage, the first processing stage does not depend on the current communications condition.

Preferably, the first processing stage includes first and second packet combiners to combine multiple processed packets for encoding by one of the first and second channel encoders. The first processing stage further preferably also includes first and second buffers for storing the encoded data from the first and second channel encoders. The second processing stage may include a third combiner which combines the channel encoded data, a puncturing device which removes selected bits in accordance with a desired coding scheme, and a modulator which modulates punctured data in accordance with a desired modulation scheme. The desired combining, puncturing, and modulating in the second processing stage are determined based upon the detected communications condition.

BRIEF DESCRIPTION OF THE DRAWINGS

The foregoing and other object, features, and advantages of the present invention may be more readily understood with reference to the following detailed description taken in conjunction with the accompanying drawings, wherein like reference numerals designate like structural elements, and in which.

DETAILED DESCRIPTION OF THE INVENTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be implemented in any data communications system between any data transmitter and data receiver. Although a specific example is provided below for a CDMA radio communications system, the invention is not limited to this example.

In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital Signal Processors (DSPs).

A mobile radio communication system must divide the radio channel resources between the different users in the system. Typically, the channel resources are divided into smaller entities in the frequency, time, and/or code domain. In a multi-code code division multiple access (CDMA) system spreading codes are used to transmit information for one or more users in parallel during a certain transmission interval. The number of data packets that can be transmitted simultaneously depends on the number of fractional channels dedicated to packet data transmission, e.g., the number of spreading codes dedicated the packet data transmission in a CDMA system. In a CDMA system, assuming that all spreading codes use the same spreading factor, the instantaneous communications channel quality is identical for all spreading codes. Hence, the same amount of data may be transmitted on each spreading code.

If a fixed set of modulation schemes and/or coding rates (MCSs) is used, then the number of data packets to be transmitted during a transmission interval is a factor of the number of spreading codes used. In using the acronym MCS, it is preferred that both the modulation scheme and coding rate are preferably adapted based on current communications conditions. However, it is to be understood that only one of the modulation scheme and coding rate may be adapted.

There are many other situations where the number of packets to transmit simultaneously contains a constant multiplicative factor. For example, a set of four different MCSs may be used so that 3, 6, 9, or 12 data packets fit into one transmission interval. Regardless of which MCS is selected for a specific transmission interval, the number of data packets to transmit will be a factor of 3 in this particular example. In general, if S denotes the number of data packets in a transmission interval, then S=L×K, where K depends on the MCS, and L is independent of the MCS.

Even without knowing the MCS selected for the transmission interval, there is still some information about the number of data packets to be transmitted in the transmission interval because the number of data packets to be transmitted is a factor of L. The present invention uses this prior knowledge in order to pre-process the data packets to minimize the amount of data processing required once the MCS is selected for the transmission interval. This preprocessing permits higher data transmission rates to be achieved. When the MCS, (i.e. K), is known for the transmission interval, the remaining data processing that depends on the value of K is lower in volume and complexity and can therefore be performed very quickly.

In a preferred example implementation of the invention later described, the preprocessing may be performed to achieve a larger data block size. By encoding data packets in groups of L, a larger encoder block size is obtained, which improves the performance of many channel encoding schemes (e.g., turbo encoders). The following is a high level explanation of why larger data block size generally improves coding performance.

A channel encoder maps a block (or a sequence) of input information bits into a block (or a sequence) of coded bits. A channel encoder of rate R=k/n means that for every k bits at the input of the encoder, n bits are generated at the output. The encoder may do this by adding redundant bits, i.e., n−k redundant bits, to the information bits. An encoder that works this way is called a systematic encoder. A turbo encoder is an example of a systematic encoder.

The encoder may also create a totally different set of bits, where none of the input bits are explicitly included. An encoder of this type is a non-systematic encoder. A random encoder can be expressed as a lookup table containing code words selected at random. Shannon proved that by letting k and n approach infinity, while keeping R constant, the channel capacity can be approached with random codes. The channel capacity is a theoretical upper limit to how much information it is possible to communicate over the channel without any errors. This means that for very long random codes a larger value of R can be used than for shorter codes while still achieving close to error free transmission. A large coding rate means that fewer redundant bits (and thus more information bits) are employed in the coding, which is desirable from a bandwidth efficiency perspective. Furthermore, all known good code structures share this property that random codes have: the longer the block size, the better the decoder performance.

There are basically two different types of conventional channel codes: convolutional codes and block codes. A convolutional encoder converts a data stream into one long code word. A block encoder breaks the data stream up into blocks of fixed length, assigning each block to a code word. Turbo codes are block codes but usually contain elements borrowed from convolutional codes.

Figure 1:
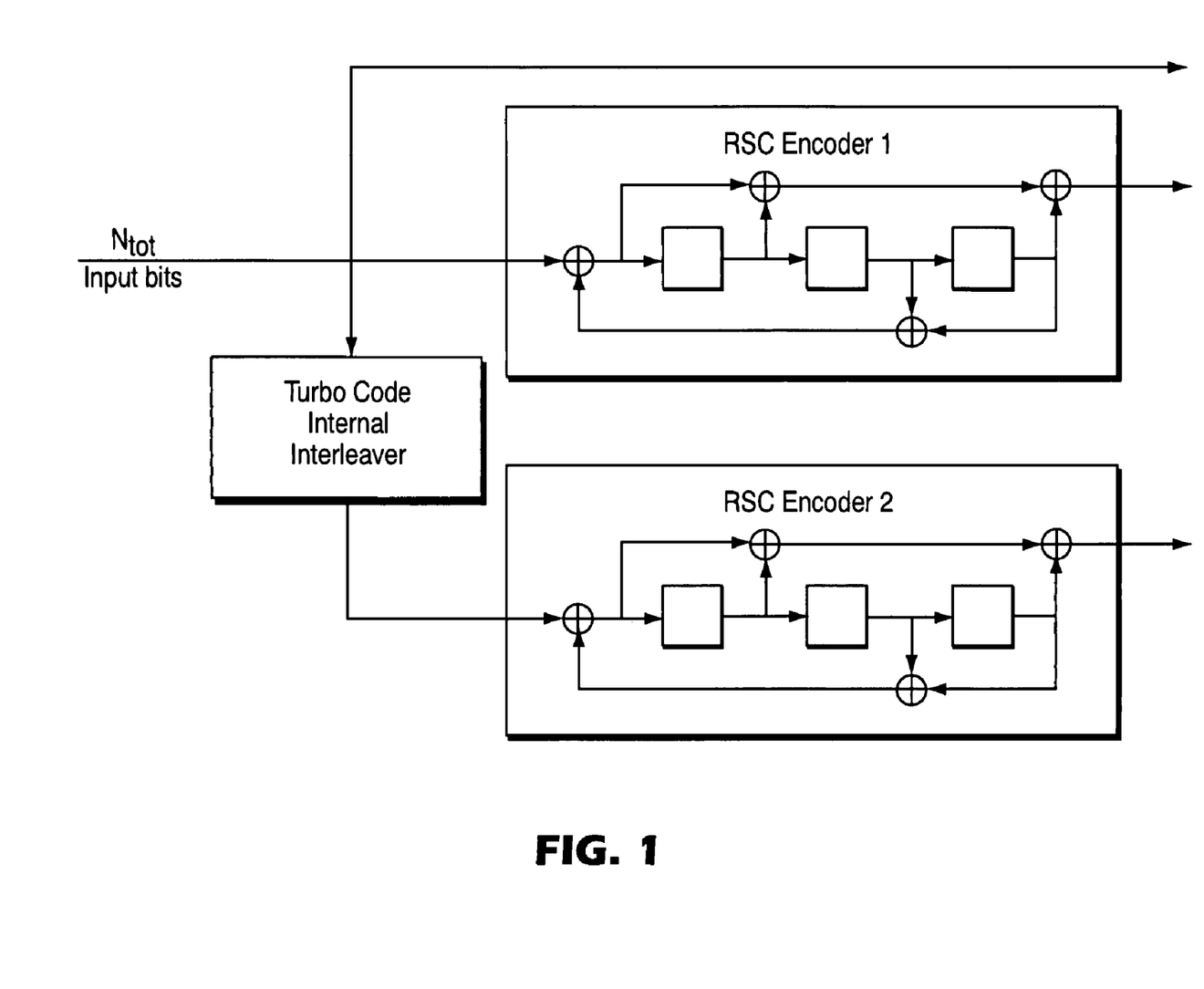
FIG. 1 is a function block diagram showing in simplified form a turbo channel encoder.

FIG. 1 illustrates an example turbo encoder of rate R=1/3 including two Recursive Systematic Convolutional (RSC) encoders. The RSC encoders are called convolutional because the linear shift register structure resembles a standard digital linear filter, and linear filters convolve the input with the filter impulse response. The term "recursive" relates to the fact that there is a feedback loop present in the RSC encoders. The two RSC encoders are concatenated in parallel and are separated by an interleaver. The interleaver takes one block of input bits and re-orders them in a random-like manner. The input bits are forwarded directly to the first RSC encoder and via the interleaver to the second RSC encoder. A turbo encoder operates on a block of input bits, $N_{tot}$, and also the size of the interleaver equals $N_{tot}$.

In fact, the encoder in FIG. 1 is not so much "turbo" as is the decoder in the receiver. The received systematic bits and the received parity bits corresponding to the first RCS encoder are used in a decoder that only takes RSC-1 into account. From this decoding process, some knowledge about the transmitted information bits is acquired. This so-called "soft information" is used to decode an interleaved version of the received systematic bits and the received parity bits from RSC-2. After this decode operation, more is known about what information was transmitted. The decoding process is repeated, but this time using what was learned about the information bits during the previous iteration of the decoding process. The decoding process may be repeated, and the performance increases a little bit in every new iteration. Hence, the use of the term "turbo." Desirable qualities of turbo encoders include: (1) the code words look like random code words to the channel, and (2) it is simple to construct very long code words. The structure imposed on the code words by the turbo encoder is enough to make the decoding process practical, but not so much that the desirable random-like properties are lost.

Figure 2:
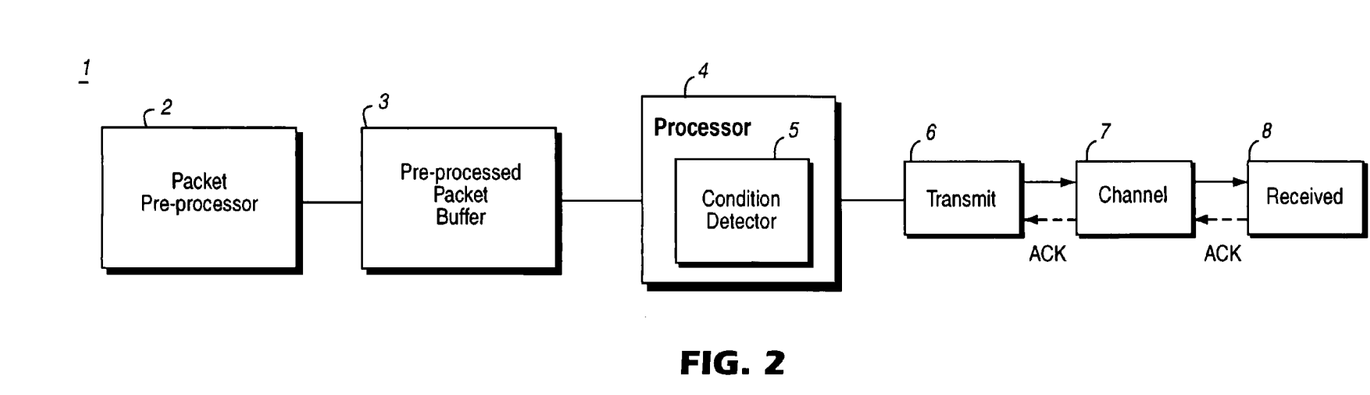
FIG. 2 illustrates the present invention in a general configuration.

FIG. 2 shows a general application the present invention in the context of a communications system 1. A data packet pre-processor 2 is coupled to a pre-processed data packet buffer 3. The packet pre-processor 2 performs various packet processing operations that must be or are desired to be performed on the data packets to be transmitted over the communications channel 7, but which do not depend upon a particular communications condition, e.g., the current condition of the communications channel. The communications condition may also correspond to events, (e.g., how much or the type of data to be transmitted), particular services, (e.g., low speed vs. high speed data services), or other types of conditions.

The pre-processed data packets are held in the buffer 3 until the current communications condition detected by condition detector 5 is known for the transmission time interval when the packets are to be transmitted over the communications channel 7. Once the processor 4 detects the current condition from detector 5, the pre-processed packets are further processed based upon the detected current condition and transmitted over the channel via transmitter 6. The receiver 8 detects the transmitted information and sends an acknowledgment signal (either positive, negative, or no acknowledgment) as appropriate. If the data is negatively acknowledged, it can be retrieved from the buffer 3 already pre-processed and immediately processed by processor 4 based on the current condition detected by detector 5.

Figure 3:
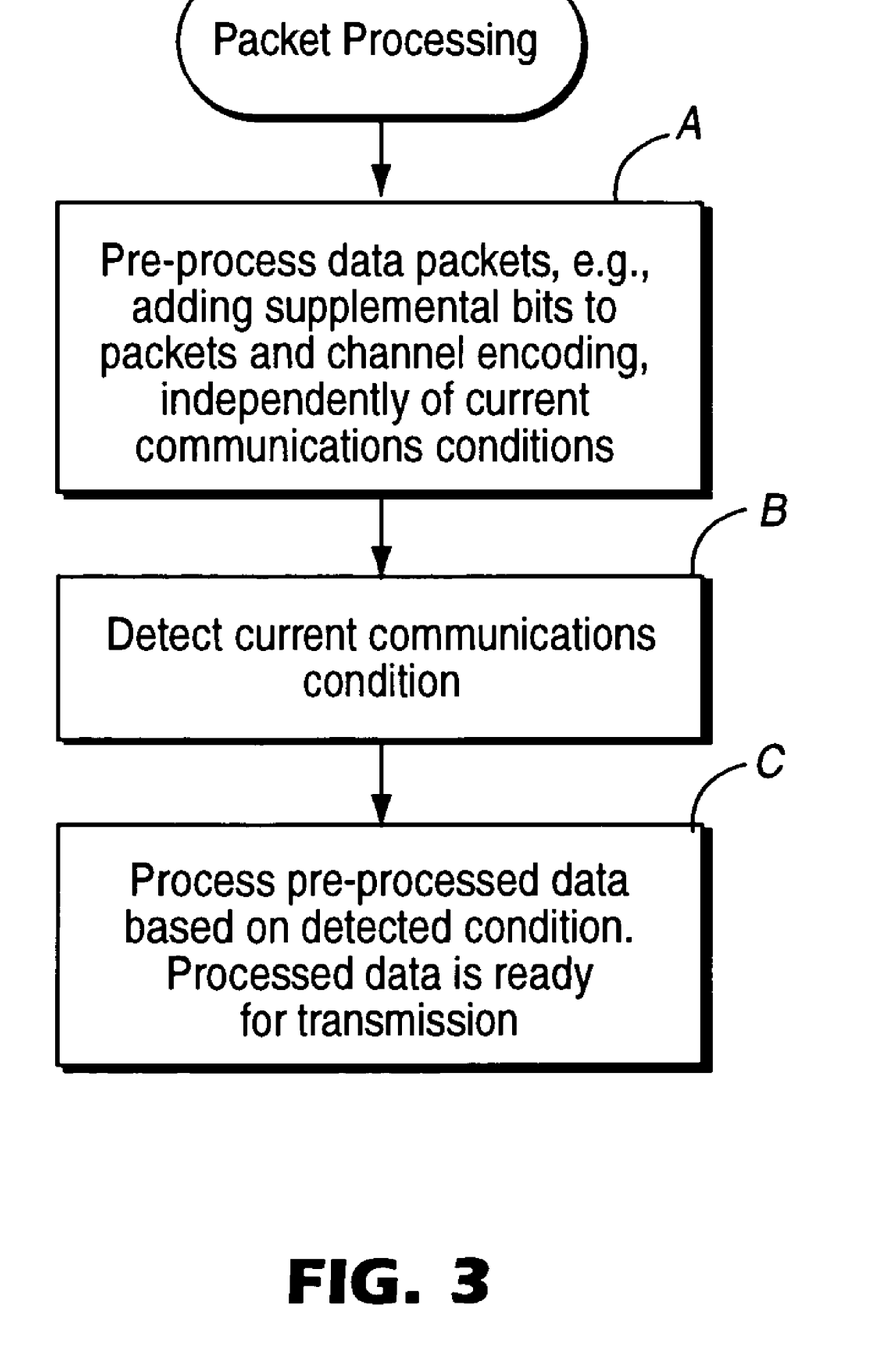
FIG. 3 is a flowchart diagram illustrating packet processing procedures implemented using the general configuration shown in FIG. 2.

FIG. 3 illustrates a packet processing routine in accordance with a general implementation of the present invention in FIG. 2. Data packets are pre-processed by performing one or more processing operations independently of a current communication condition (step A). Example pre-processing operations include adding supplemental data bits to packets and channel encoding. A current communications condition is detected (step B). For example, the quality of the communications channel is determined. In a radio communications environment, the communications channel condition may vary quite rapidly depending upon changing interference, noise, fading, and other factors. Based on the detected communications condition, the pre-processed data blocks are further processed in accordance with operations that vary depending upon the detected communication condition (step C). For example, the ultimate desired coding rate and/or the modulation scheme used to modulate the data may be selected depending upon the channel condition.

Figure 4:
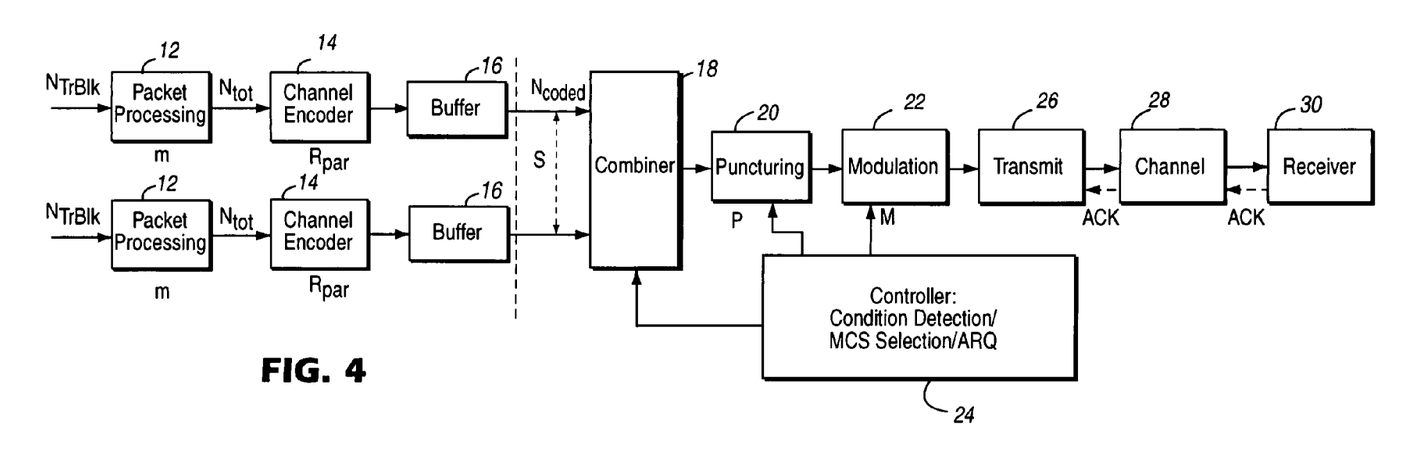
FIG. 4 is a first example implementation of the present invention.

FIG. 4 illustrates one example implementation of the present invention that employs a single combiner 18 as compared to the dual combiners 124 used in the example implementation shown in FIG. 6 and later described. The size (number of bits) of each data packet or transport block is denoted $N_{TrBlk}$. Each data packet is processed by a packet processing block 12 that adds m bits to each data packet. Each packet processing block 12 may be used to perform one or more packet processing operations including, for example, inserting packet sequence numbers, CRC bits, and/or tail bits. Sequence numbers may be needed to keep track of which packets have been successfully communicated and to ensure that the packets are received in the correct order. Cyclic redundancy check (CRC) bits are used to determine whether a data packet contains any errors. Tail bits are made to be inserted for certain types of channel encoders, such as turbo encoders and convolutional encoders, to force the encoder to a predefined state at the end of the transport block.

The resulting processed packet includes $N_{tot}=(N_{TrBlk}+m)$ bits which are then channel encoded by a fixed rate parent channel encoder 14 having a fixed coding rate of $R_{par}$ so that the output of each channel encoder is $N_{coded}=N_{tot}/R_{par}$ bits. The channel encoded bits are then stored in a corresponding buffer 16 at the end of the pre-processing operations. Of course, other preprocessing operations and/or different pre-processing operations may be employed.

The vertical dashed line indicates that the operations which follow depend upon the selection of MSC scheme for the relevant transmission time interval. A controller block 24 detects a current communication condition, e.g., the condition of the communications channel, and selects a particular MCS scheme best suited for that current condition. The MCS selection is then provided to the combiner 18, the puncturing block 20, and the modulation block 22. Once the MSC scheme is known, then the number of data packets to be included in the transmission interval(s) is (are) known. The combiner 18 reads $S=L \times K$ pre-encoded data blocks from the buffers 16 connected to the channel encoders 14. The factor L is known in advance, but the factor K depends on the MCS. The output from the combiner is a "superblock" consisting of S pre-encoded blocks. This "superblock" contains all the information that will be transmitted in the present transmission interval. Thus, when the MCS is known, the combiner 18 knows how much data to read from the buffers 16.

The combined encoded bits are punctured in the puncturing block 20 in accordance with a puncturing pattern defined by P. The puncturing pattern can be described by a vector of length p and P(i) denotes the i-th element of P. The puncturing block 20 punctures (i.e., not transmit) each bit having an index i such that P(i mod p)=0. Using puncturing, a large family of different effective code rates R are obtained while permitting pre-processing encoding of the original data packets using a fixed rate parent encoder.

There are other possibilities to change the rate of a specific parent encoder. One is repetition. Repetition can be described using a repetition vector P determining how many times a specific bit is transmitted. This is analogous to how puncturing is described, but the elements of the repetition vector can take on other values than 0 and 1. Assume a parent encoder of rate $R_{par}=1/2$ and a desired code rate after repetition of R=1/3. This desired code rate can be done yb applying the repetition pattern P=[2 1]. All odd numbered bits are transmitted twice, and all evenly numbered bits only once. The repetition scheme can be viewed as a channel encoder with rate $R_{rep}$=2/3, (i.e., three bits out for every two bits in). The overall rate is now R=$R_{par}$×$R_{rep}$=1/2×2/3=1/3. A second alternative is to insert some dummy bits that have no other function than to make the rates match. The dummy bits are then discarded in the receiver. Insertion of dummy bits is known as bit-padding. A third option is to use a combination of puncturing, repetition, and/or bit-padding.

The number of bits generated by the puncturing block 20 is (S*$N_{tot}$/R). The modulator block 22 maps these bits into points belonging to the selected signal constellation in accordance with the selected MCS. Commonly used signal constellations include for example QPSK, 8-PSK, 16-QAM, 64-QAM, etc. A signal constellation consisting of M points uses log2(M) constellation points. The transmitter 26 transmits the modulated information over the channel 28 for detection by the receiver 20. Controller 24 handles any ARQ retransmissions.

Adaptation of modulation scheme and/or coding rate based on current channel quality (one example communication condition) is particularly advantageous to radio communications systems, e.g., code division multiple access (CDMA) communication systems, because increasing the base station transmit power for an individual subscriber communication adversely impacts other mobile subscriber communications, and ultimately, limits the overall system capacity. In contrast, changing the modulation and/or coding format to match the current channel quality, without increasing the transmit power, does not adversely impact other mobile subscriber communications or the overall system capacity. Mobile terminals close to the base station (presumably experiencing a high channel quality) may be assigned a higher order modulation that provides higher bit rates. A lower order modulation offering a lower bit rate may be employed for communications zenith mobile terminals farther away from the base station (presumably experiencing lower channel quality). Similarly, when the channel quality is relatively good, higher coding rates (i.e., less redundancy) may be employed. Lower coding rates (i.e., more redundancy) may be employed for lower channel quality conditions. The underlying assumption is that the maximum data rate reasonably supported for each mobile terminal, (i.e., the maximum data rate under the current radio channel conditions to meet a certain performance standard such as a maximum bit error rate), depends on the channel quality experienced by the mobile terminal.

Figure 5:
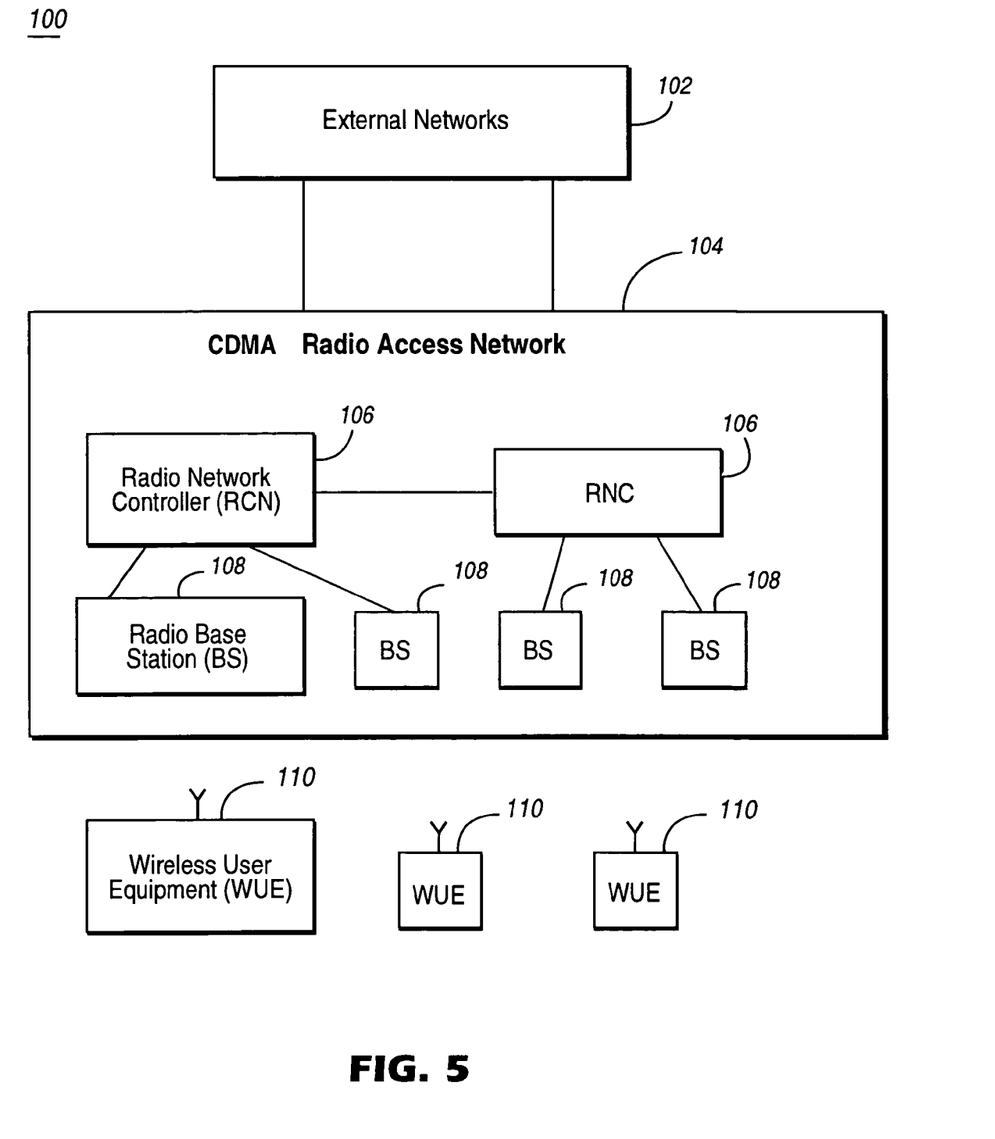
FIG. 5 illustrates a radio communications system in which the present invention may be employed.

FIG. 5 illustrates an example CDMA communications system 100. External networks 102, which may include circuit-switched type networks as well as packet-switched type networks, connected to a CDMA radio access network 104 that includes one or more radio network controllers (RNCs) 106. Each RNC 106 is connected to a plurality of radio base stations (BSs) 108 and to other RNCs in the radio access network 104. Radio communications between one or more base stations 108 and a wireless user equipment (WUE) 110 are by way of a radio interface. A mobile radio terminal is an example of a wireless user equipment 110. Radio access in this non-limiting example is based on CDMA with individual radio channels being distinguished using spreading codes. CDMA provides wide radio bandwidth for multimedia services including packet data applications with high data rate/bandwidth requirements. One scenario in which high speed data may need to be transmitted downlink from the radio access network 104 over the radio interface to a wireless user equipment 110 is when the wireless user equipment 110 requests information from a computer attached to the Internet, e.g., a website.

Figure 6:
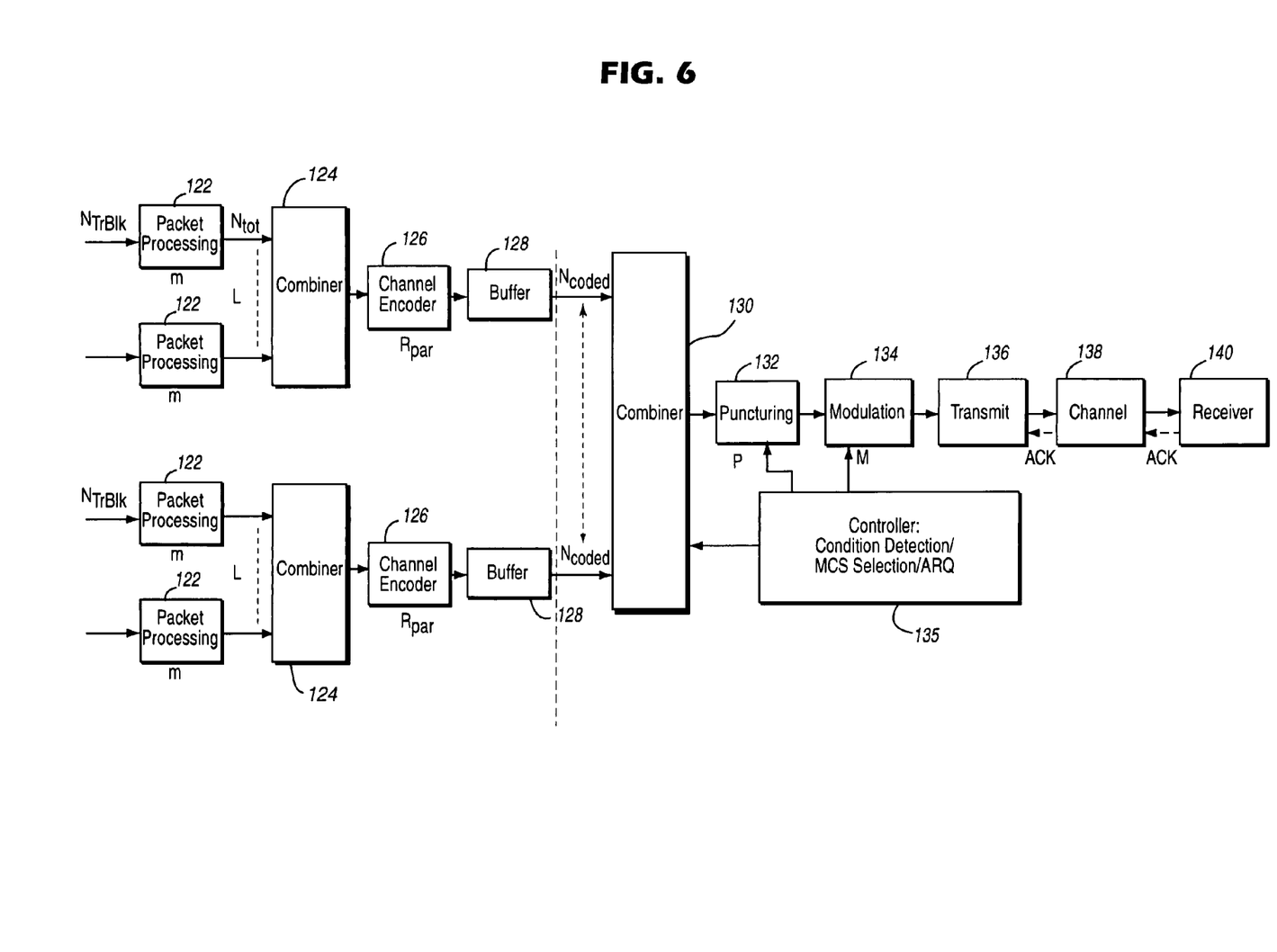
FIG. 6 illustrates a preferred example implementation of the present invention.

With this downlink, high speed data transmission application in mind, FIG. 6 illustrates in function block format a preferred, example implementation of the present invention. For this application, a radio base station 108 includes blocks 122–136, and the WUE 110 corresponds to the receiver block 140.

In FIG. 6, the size of each data packet or transport block (i.e., the number of bits) is denoted $N_{TrBlk}$. Each transport block is processed by a packet processing block 122. The number of bits added to each data packet by the packet processing block 122 is denoted by m, and the resulting number of bits is $N_{tot}$=$N_{TrBlk}$+m. Examples of packet processing that may be carried out in block 122 include insertion of sequence numbers, CRC bits, and/or tail bits as described above in conjunction with FIG. 4. The $N_{tot}$ bits from each of the L packet processing blocks 122 is combined together in a combiner block 124 and provided to a corresponding fixed rate, channel encoder 126. In the preferred embodiment, two L-packet combiners 126 are employed. The number of bits at the input of each of two fixed coding rate channel encoders 126 equals $N_{tot}$×L. Each channel encoder 126 encodes these bits using a fixed code rate $R_{par}$, resulting in $N_{coded}$=($N_{tot}$×L)/$R_{par}$ bits at the channel encoder output. The pre-processed, $N_{coded}$ data bits may optionally be stored in a corresponding buffer 128 awaiting further processing that depends on the MCS selection.

Before the combining of K encoded blocks in a second combiner block 130, the MCS selected for the current transmission interval must be known. However, all operations before this second combiner 130 are performed without knowledge of and independently from the MCS. Since the packet processing 122, combining 124, and channel encoding 126 operations are performed independently of the MCS, these computationally intensive and/or time consuming operations may be performed before the MCS decision is made. This pre-processing of data packets as soon as they are available significantly speeds up the data packet processing, thereby permitting higher data transmission rates. Moreover, use of the L-packet combiners 124 increases the data block size from $N_{tot}$ to $N_{tot}$×L which improves the performance of the channel encoder for reasons already explained.

The value of K depends on the selected MCS. Once the value of K is known for the transmission time interval for data stored in the buffers 128, the combiner 130 combines the K, $N_{coded}$ data blocks to generate an output of (L×K×$N_{tot}$)/$R_{par}$ bits. These bits are then punctured in puncturing block 132 in accordance with a puncturing pattern defined by P. The puncturing pattern is selected based on the desired coding rate (different from the fixed coding rate employed by the channel encoders) for the transmission interval as determined from the current communications channel condition.

The number of bits at the output of the puncturing block 132 is (L×K×$N_{tot}$)/R. The puncturing may also be performed before the second combiner 130, but in either case, puncturing cannot be performed before the MCS is known. The bits coming from the puncturing block 132 (or from the combiner 130 if puncturing is performed before combining) are forwarded to the modulator 134. The number of signal constellation symbols at the output of the modulator 134 equals (L×K×$N_{tot}$)/(R×$\log_2$(M)). The generated signal constellation points are transmitted via the transmitter 136 over the communications channel 138 to receiver 140 using the spreading code(s) (time slot(s) and/or frequency band(s)) designated for the transmission of the data packets. In the case of multicode DS-CDMA, the constellation symbols from the modulator 134 are divided on the L spreading codes before spreading in the base station transmitter.

The controller 135 detects for each transmission interval the current communications channel condition. In response to that detection, controller 135 selects the value for K used to select the number of coded blocks, the puncturing pattern, and the modulation scheme. As an example, assume the number of constellation symbols that can be transmitted on one spreading code during one transmission interval, (i.e., one time slot), equals $N_{symbols}$. If there are L spreading codes, then a total of $N_{symbols} \times L$ constellation symbols are transmitted during the time slot. Using a M-QAM modulator, $\log_2(M)$ coded bits may be transmitted by transmitter 136 on every constellation symbol, (i.e., 1, 2, 3, 4, 5, or 6 bits for M=2, 4, 8, 16, 32, or 64 respectively) over channel 138. The desired coding rate R is obtained by puncturing the fixed channel encoder rate $R_{par}$ using a puncturing scheme defined by P. Thus, the number of information bits that fits into one time slot is $N_{symbols} \times L \times \log_2(M)/R$.

Puncturing is performed to obtain different coding rates from the fixed coding rate $R_{par}$ of the channel encoder 126. Assume that $R_{par}=1/3$ and that the puncturing pattern P is a vector of p elements. If rate R is to be 1/2 after puncturing, the puncturing pattern P=[1 1 0 1 0 1] can be used, where p=6. For every 6 input bits, bit numbers 1, 2, 4, and 6 are transmitted, and bit numbers 3 and 5 are "punctured" or not transmitted. The puncturing block 132 can be viewed as having a rate $R_{punct}$, that is larger than 1. In this example, there are 4 bits at the output of the puncturing block for every 6 bits at the input, so that $R_{punct}=6/4$. The rate after the puncturing equals $R=R_{par} \times R_{punct}=(1/3) \times (6/4)=1/2$. Accordingly, by selecting different puncturing patterns, a large number of different rates R may be obtained while still using the same fixed rate channel encoder 126. When puncturing a turbo code, the puncturing pattern is preferably selected so that only parity bits are punctured. This is in general not a problem since every n-th output bit from a rate 1/n turbo encoder is a systematic information bit. In the example above, the bits number 1 and 4 are assumed to be systematic bits, and hence these bits are not punctured.

This number of bits should match an integer number S of data packets. Each data packet has the size $N_{tot}$, e.g., after CRC and tail bits have been added. In the dual combiner scheme in FIG. 6, $S=L \times K$ which results in the following equality $$L \times K \times N_{tot} = N_{symbols} \times L \times \log_2(M)/R.$$

Figure 7:
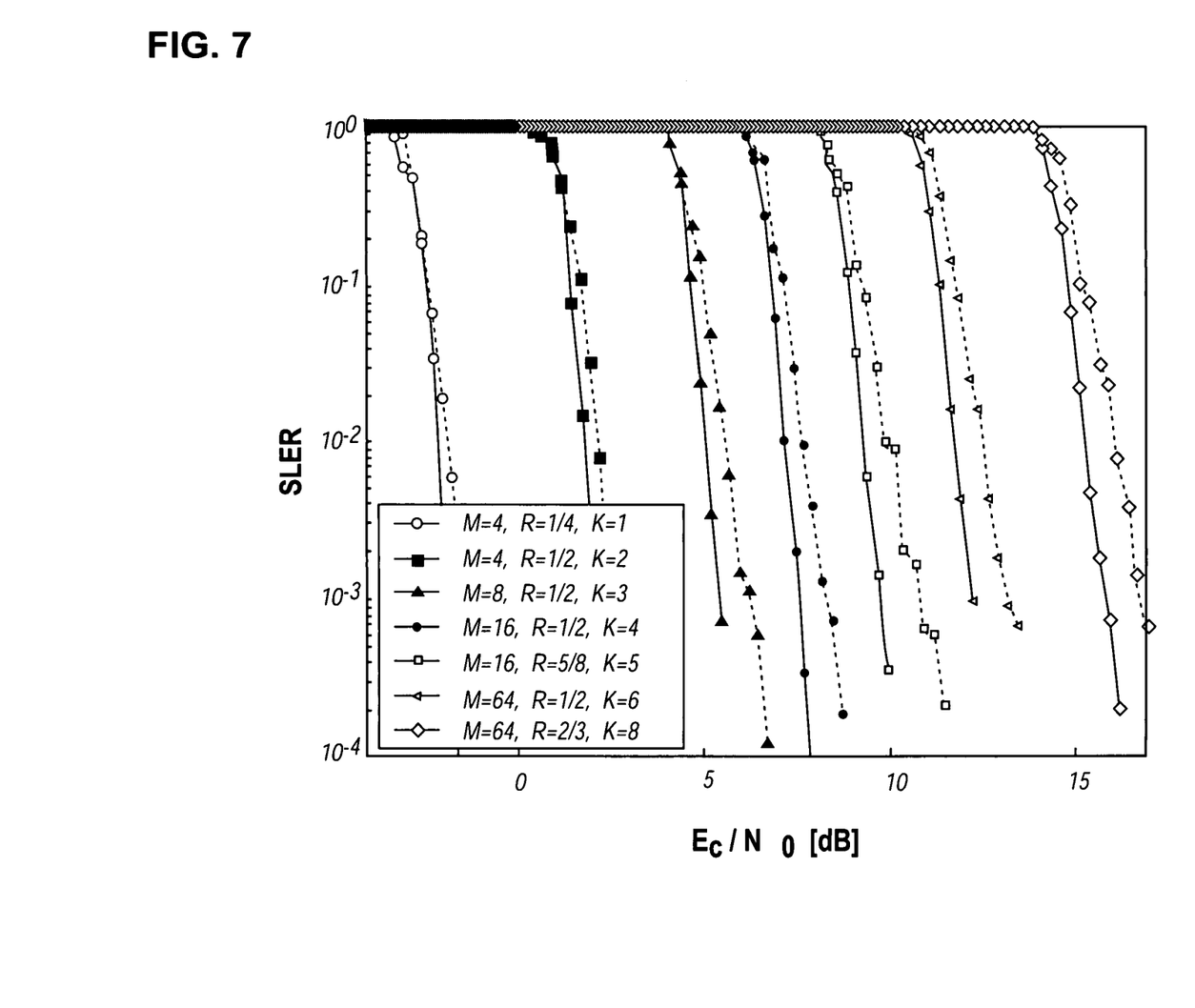
FIG. 7 is a graph showing a simulation of slot error rate (SLER) as a function of signal-to-noise ratio to compare the performance of the example implementations of the present invention shown in FIGS. 4 and 6.

From this equality, K=(Nsymbols/Ntot)×(log2(M)/R). If, for example, $N_{symbols}=640$ and $N_{tot}=320$ for a particular communications protocol, $(N_{symbols}/N_{tot})=2$. If M and R are selected so that $(\log_2(M)/R)$ equals 0.5, 1, 1.5, 2, . . . , then K=1, 2, 3, . . . etc. Comparing all combinations of M and R that give integer values of K, we can select the best combinations as our set of MCSs. The MCSs used in the numerical example of FIG. 7 are listed in Table 1 below.

TABLE 1

MCSs used in the numerical example. $N_{tot}$ = 320.

| MCS # | Rate | Modulation | K |
|---|---|---|---|
| 1 | ¼ | 4 | 1 |
| 2 | ½ | 4 | 2 |

TABLE 1-continued

MCSs used in the numerical example. $N_{tot}$ = 320.

| MCS # | Rate | Modulation | K |
|---|---|---|---|
| 3 | ½ | 8 | 3 |
| 4 | ½ | 16 | 4 |
| 5 | ⅝ | 16 | 5 |
| 6 | ½ | 64 | 6 |
| 7 | ⅔ | 64 | 8 |

In order to show different types of performance gains, a comparison is made of the preferred, dual combiner arrangement in FIG. 6 (arrangement #1) to the arrangement shown in FIG. 4 (arrangement #2). For this comparison, assume that L=3 for arrangement #1. Assume $N_{TrBlk}=301$ and m=19, (corresponding to 3 tail bits and 16 CRC bits per transport block), which gives $N_{tot}=320$. The fixed rate channel encoder is a turbo encoder with code rate $R_{par}=1/5$, and the RSC generators are $g_0=13$, $g_1=15$, and $g_2=17$. The RSC generator polynomials are given in octal format. The recursive polynomial is $g_0$, and $g_1$ and $g_2$ are the parity polynomials. The turbo encoder internal interleaver is specified in 3G TS 25.201, $3^{rd}$ Generation partnership project (3GPP): Technical specification group radio access network; Multiplexing and channel coding (FDD), version 3.2.0, March 2000. The number of turbo decoder iterations used in this example is 4, and the different MCSs are listed in Table 1. The modulator uses conventional, 2-dimensional Gray mappings from bits to symbols. The channel used for this example is an ordinary AWGN channel with single-sided noise spectral density $N_0$. The average energy per transmitted constellation point is denoted $E_c$. Simulated results of the slot error rate (SLER) as function of the channel signal-to-noise ratio ($E_c/N_0$) in decibel are shown in FIG. 7. Results for arrangement #1 are shown with solid lines, and results for arrangement #2 are shown using dashed lines. FIG. 7 shows the superior performance of arrangement #1 where the difference in required $E_c/N_0$ to achieve SLER $10^{-3}$ is on the order of 1 dB.

The preferred example arrangement of the present invention also reduces the amount of control signaling associated with acknowledgement/negative acknowledgement (ACK/NACK) of data packets. Usually, ACK/NACK signaling can be performed on a transmission interval level or on an individual data packet level. The disadvantage with signaling a positive acknowledgement or a negative acknowledgement for each transmission interval is there may be several correctly received data packets together with one or more erroneous packets in a particular transmission interval. Even if only one of the entire batch of data packets is received in error, all of the packets for that transmission interval must be resent, which is a waste of channel resources. Alternatively, if only individual erroneous data packets are retransmitted, a larger amount of fairly complex control signaling is needed.

Using the preferred, example implementation in FIG. 6, ACK/NACK signals may be sent for specific groups of data packets transmitted in the same transmission interval by receiver 140. Referring to FIG. 6, L data packets are grouped together and then encoded by the same channel encoder. Even though each transport block/data packet includes an error indication field, (e.g., added CRC bits), an ACK may be sent for a specific group of L packets if all L packet error indicators within the group of L packets indicate that each of the L packets is correctly received. Otherwise, all L packets in that group are retransmitted.

A significant advantage with this ACK/NACK scheme is that the amount of required control signaling compared to individual data packet ACK/NACK schemes is reduced by a factor of L. Furthermore, because the amount of required control signaling is independent of L, when L equals the number of channels used for packet data transmission, a fixed control signaling scheme may be used, even if the value of L varies.

When a retransmission occurs, it is not necessary for the receiver to discard the data packets previously received. Soft combining may be employed to combine information received from the original data packet transmission and any previous retransmissions of that data packet. The channel decoder uses the combined information to more accurately decode that data packet. In the FIG. 6 implementation, "soft combining" of retransmitted data packets in the receiver using a MCS different than the MCS used in the original transmission is easier because retransmissions are performed on all L packets in the group encoded by the same channel encoder. If the retransmissions contain data packets encoded in a different grouping than that used in the original transmission, then soft combining may become quite difficult to perform. By keeping the same grouping of data packets in the original transmission and in the retransmission, channel encoding need not be performed for the retransmission. The $N_{coded}$ output bits from the channel encoder (see FIG. 6) may be stored in the group buffer 128 and used for any retransmissions under the supervision of controller 135. Only the puncturing and the modulating operations are performed for retransmission using the same or a different MCS.

The present invention provides an efficient and flexible solution to the problem of quickly combining a number of data packets to fit into a transmission slot. The data packets are combined and pre-encoded before the MCS is known. Once the MCS is known, a number of such pre-processed data blocks are combined. The pre-processed blocks are punctured to provide channel coding in accordance with the MCS, and the remaining bits are mapped onto signal constellation points using the corresponding modulation scheme. Since both puncturing and signal mapping (modulation) are usually lower complexity operations than channel encoding, the amount of time-critical signal processing is significantly reduced. More complex channel encoding and other operations like packet processing can be performed in advance without any knowledge of the MCS. Another advantage of the preferred implementation of the present invention is that the block size of the channel encoder increases when combining several packets before encoding. This increased block size improves channel encoder performance for many different types of channel encoder structures including turbo encoders. ACK/NACK signals may also be transmitted for groups of data packets instead of sending an ACK/NACK for each data packet. This reduces the amount of required control signaling, and also makes soft combining in the receiver simpler.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, although the CDMA example above focused on a downlink application, the present invention may be used in uplink applications. Also, while examples are provided for pre-processing operations, one or more different operations that do not depend on a selected MCS could be performed in advance. Further, there might be different or other operations that depend on the MCS. Accordingly, it is intended that the invention be limited only by the scope of the claims appended hereto.

What is claimed is:

1. A method for processing data packets for transmission over a communications channel, comprising:
   pre-processing data packets for transmission over the communications channel including performing a first coding operation on those data packets to form pre-processed data packets;
   detecting a current channel condition; and
   processing the pre-processed data packets including modulating the pre-processed data packets using a modulation scheme selected from a group of different modulation schemes based on the detected current channel condition and coding the pre-processed data packets using a coding rate selected from a group of different coding rates based on the detected current channel condition to form processed data packets ready for transmission over the communications channel,
   wherein the pre-processing does not depend on the current channel condition.

2. The method in claim 1, wherein the current condition is the current condition of the communications channel.

3. The method in claim 2, wherein the current condition is the current condition of the communications channel during a current transmission time interval.

4. The method in claim 1, wherein the current condition relates to a communications service.

5. The method in claim 1, wherein the pre-processing includes channel encoding the data packets at a fixed coding rate.

6. The method in claim 1, wherein the pre-processing includes combining the data packets into data blocks.

7. The method in claim 6, further comprising:
   waiting for an acknowledgement signal for each of the data blocks, and
   if an acknowledgement signal is not received for one of the data blocks, retransmitting the data block.

8. The method in claim 7, further comprising:
   storing the data blocks in a retransmission buffer awaiting the acknowledgement signal.

9. The method in claim 8, further comprising:
   retransmitting an unacknowledged data block using the same processing employed when the unacknowledged data block was first transmitted.

10. The method in claim 8, further comprising:
    retransmitting an unacknowledged data block using different processing from the processing employed when the unacknowledged data block was first transmitted.

11. The method in claim 6, wherein the pre-processing includes adding supplemental bits to each of the data packets before combining.

12. The method in claim 11, wherein the supplemental bits include one or more of the following types of information: error detection information, error correction information, tail information, and data packet sequence information.

13. The method in claim 6, wherein the pre-processing includes channel encoding the data blocks at a fixed coding rate to form the pre-processed data blocks.

14. The method in claim 1, wherein the processing includes obtaining a coding rate desired for the current condition.

15. The method in claim 1, wherein the group of modulation schemes includes: QPSK, 8-PSK, 16-QAM, AND 64-QAM.

16. The method in claim 1, wherein the processing includes combining the pre-processed data packets.

17. The method in claim 16, wherein the combining is performed based on the current condition.

18. The method in claim 16, wherein the processing further includes manipulating the combined pre-processed data packets to achieve a coding rate desired for the current channel condition.

19. The method in claim 18, wherein the manipulating is performed in accordance with a puncturing scheme selected based on the detected current channel condition that achieves the desired coding rate.

20. A method for processing data packets for transmission over a communications channel, comprising:
pre-processing data packets for transmission over the communications channel including performing a first coding operation on those data packets to form pre-processed data packets;
detecting a current channel condition; and
processing the pre-processed data packets based on the detected current condition to form processed data packets ready for transmission over the communications channel,
wherein the pre-processing does not depend on the current condition and includes:
combining a first set of data blocks to produce a first set of combined data blocks;
combining a second set of data blocks to produce a second set of combined data blocks;
encoding the first set of combined data blocks to produce a first channel encoded data block;
encoding the second set of combined data blocks to produce a second channel encoded data block, and
wherein the processing includes:
combining the first and second channel encoded data blocks in a manner that depends on the detected current channel condition to produce a combined channel encoded data block;
selecting a puncturing pattern based on the detected current channel condition;
puncturing one or more bits from the combined channel encoded data block in accordance with the selected puncturing pattern to achieve a desired coding rate;
selecting one of plural modulation schemes based on the detected current channel condition; and
modulating the punctured data block in accordance with the selected modulation scheme.

21. The method in claim 20, further comprising:
adding supplemental information to a first set of data packets to produce the first set of data blocks, and
adding supplemental information to a second set of data packets to produce the second set of data blocks.

22. The method in claim 20, further comprising:
determining the desired channel rate based on the detected channel condition.

23. The method in claim 20, further comprising:
detecting a change in current transmission condition, and determining how the first and second channel encoded data blocks should be combined based on the changed condition.

24. The method in claim 20, further comprising:
detecting a change in current transmission condition, and determining a new desired channel rate from the changed condition.

25. The method in claim 20, further comprising:
detecting a change in current transmission condition, and determining a new modulation scheme from the changed condition.

26. The method in claim 20, further comprising:
waiting for an acknowledgement signal for the first and second channel encoded data blocks;
detecting that one of the first and second channel encoded data blocks is not acknowledged; and
retransmitting the one channel encoded data block.

27. The method in claim 20, further comprising:
storing the first channel encoded data block in a first buffer, and
storing the second channel encoded data block in a second buffer.

28. The method in claim 27, further comprising:
retransmitting one of the first or second encoded data blocks from a corresponding one of the first and second buffers.

29. Apparatus for use in a transmitter which transmits data over a communications channel, comprising:
a first processing stage configured to pre-process data packets for transmission over the communications channel including performing a first coding operation on those data packets to form pre-processed data packets;
a detector configured to detect a current communications channel condition; and
a second processing stage configured to process the pre-processed data packets including modulating the pre-processed data packets using a modulation scheme selected from a group of different modulation schemes based on the detected communications channel condition and coding the pre-processed data packets using a coding rate selected from a group of different coding rates based on the detected current channel condition to form processed data packets ready for transmission over the communications channel,
wherein the first processing stage pre-processing does not depend on the current communications channel condition.

30. The apparatus in claim 29, further comprising:
a controller configured to control the configuration of the second processing stage based on the detected communications condition.

31. The apparatus in claim 29, wherein the first processing stage includes a channel encoder configured to encode the data packets at a fixed coding rate.

32. The apparatus in claim 29, wherein the first processing stage is configured to combine the data packets into data blocks.

33. The apparatus in claim 32, wherein the first processing stage is configured to add supplemental bits to each of the data packets before combining.

34. The apparatus in claim 33, wherein the supplemental bits include one or more of the following types of information: error detection information, error correction information, tail information, and data packet sequence information.

35. The apparatus in claim 29, wherein the group of modulation schemes includes: QPSK, 8-PSK, 16-QAM, and 64-QAM.

36. The apparatus in claim 29, wherein the second processing stage is configured to combine the pre-processed data packets.

37. The apparatus in claim 36, wherein the combining is performed based on the current channel condition.

38. The apparatus in claim 29, wherein the second processing stage is configured to manipulate the combined pre-processed data packets using a puncturing scheme selected based on the detected current channel condition.

39. The apparatus in claim 29, further comprising:

a buffer configured to store the pre-processed data packets.

40. Apparatus for use in a transmitter which transmits data over a communications channel, comprising:

a first processing stage configured to pre-process data packets for transmission over the communications channel including performing a first coding operation on those data packets to form pre-processed data packets;

a detector configured to detect a current communications channel condition; and a second processing stage configured to process the pre-processed data packets based on the detected communications condition to form processed data packets ready for transmission over the communications channel, wherein the first processing stage pre-processing does not depend on the current communications condition and includes:

a first combiner configured to produce a first set of combined packets;

a second combiner configured to produce a second set of combined packets;

a first encoder, coupled to the first packet combiner, configured to encode the first set of combined packets;

a second encoder, coupled to the second packet combiner, configured to encode the second set of combined packets, and wherein the second processing stage includes:

a third combiner, coupled to the first and second encoders, configured to combine the first and second set of encoded packets into a combined output in a manner that depends on the detected current channel condition;

a puncturing controller, coupled to the third combiner, configured to puncture the combined output in accordance with a puncturing pattern selected based on the detected current channel condition to achieve a desired coding rate; and a modulator, coupled to the puncturing controller, configured to modulate the punctured output in accordance with a modulation scheme selected from plural different modulation schemes based on the detected current channel condition for transmission over the communications channel.

41. The apparatus in claim 40, further comprising:

a first packet processor configured to add supplemental information to a first set of data packets to produce the first set of data blocks, and a second packet processor configured to add supplemental information to a second set of data packets to produce the second set of data blocks.

42. The apparatus in claim 40, further comprising:

a controller configured to determine the desired channel rate based on the detected channel condition.

43. The apparatus in claim 40, wherein the first and second packet combiners and the first and second encoders are configured to function independently of the transmission condition.

44. The apparatus in claim 40, further comprising:

a first buffer storing the first channel encoded data block, and a second buffer storing the second channel encoded data block.

* * * * *

UNITED STATES PATENT AND TRADEMARK OFFICE
CERTIFICATE OF CORRECTION

PATENT NO. : 7,178,089 B1  
APPLICATION NO. : 09/643983  
DATED : February 13, 2007  
INVENTOR(S) : Frenger et al.

Page 1 of 1

It is certified that error appears in the above-identified patent and that said Letters Patent is hereby corrected as shown below:

Title Page, Item (54), in "TITLE", in Column 1, Line 1, delete "DATE" and insert -- DATA --, therefor.

Title Page, Item (56), under "OTHER PUBLICATIONS", in Column 2, Line 3, after "Specification" delete "Group".

In Column 1, Line 1, delete "DATE" and insert -- DATA --, therefor.

In Column 1, Line 39, delete "vanes" and insert -- varies --, therefor.

In Column 4, Line 1, delete "preprocessing" and insert -- pre-processing --, therefor.

In Column 6, Lines 13-14, delete "preprocessing" and insert -- pre-processing --, therefor.

In Column 6, Line 20, delete "preprocessing" and insert -- pre-processing --, therefor.

In Column 8, Line 31, delete "preprocessing" and insert -- pre-processing --, therefor.

In Column 9, Line 38, delete "zenith" and insert -- with --, therefor.

Signed and Sealed this

Seventeenth Day of June, 2008

JON W. DUDAS  
*Director of the United States Patent and Trademark Office*